Figure 1:
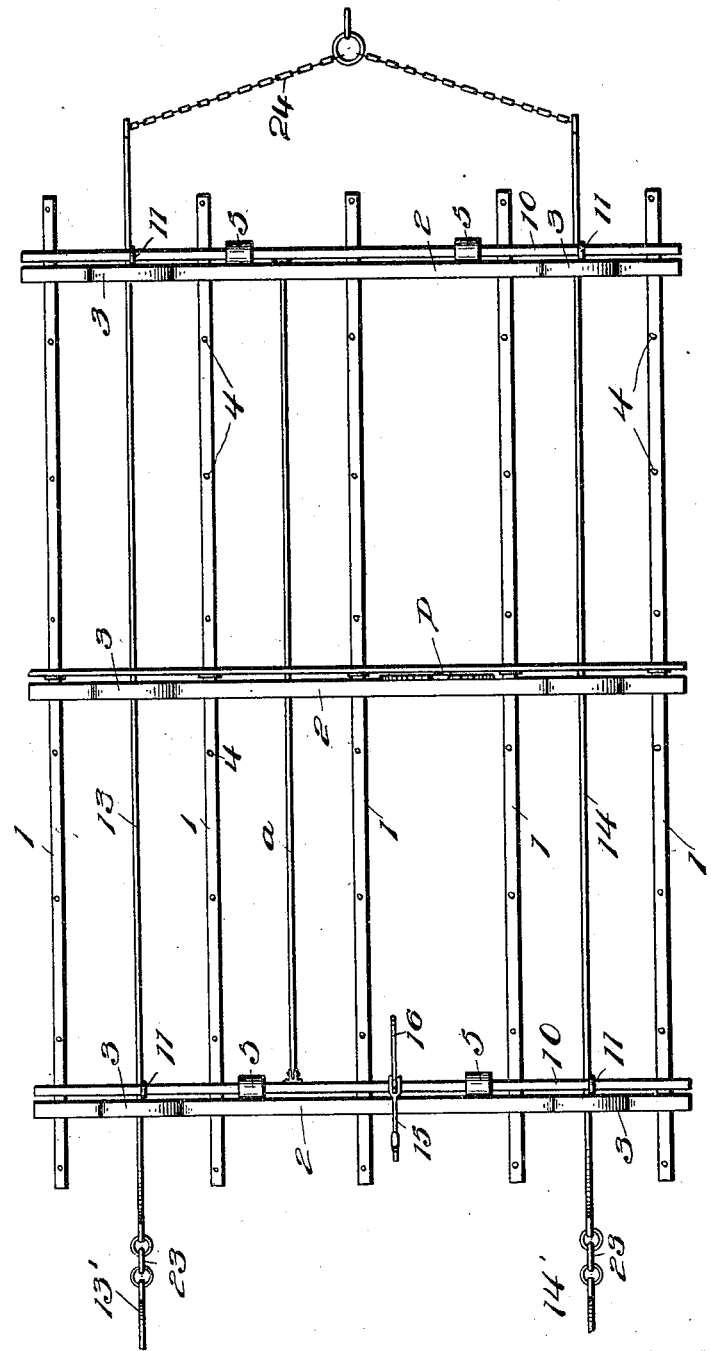

No. 825,193. PATENTED JULY 3, 1906.
I. B. CUSHING.
HARROW.
APPLICATION FILED MAY 3, 1905.
2 SHEETS—SHEET 2.
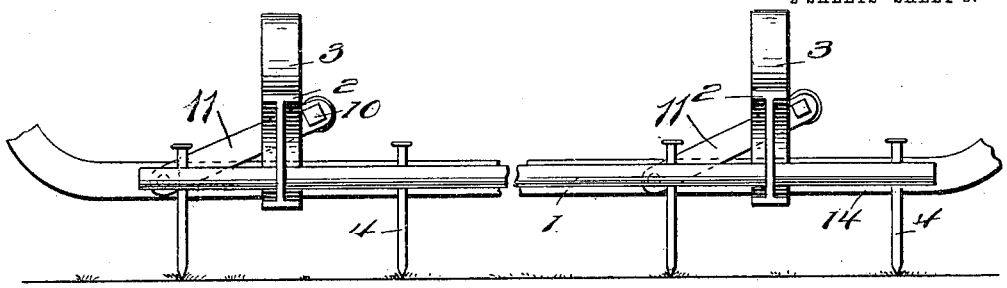
Fig. 2.
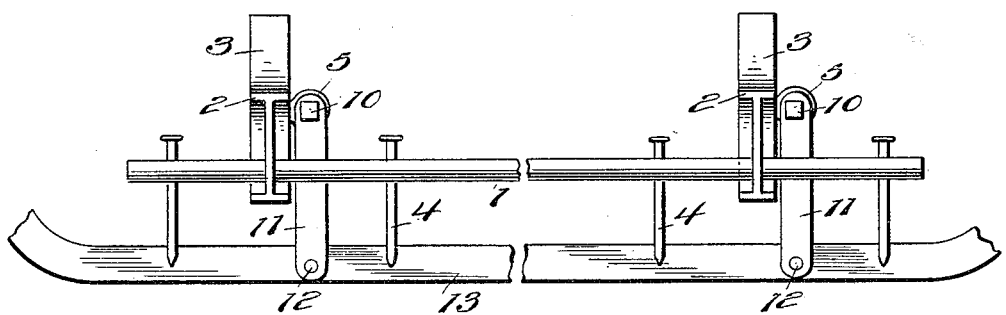
Fig. 3.
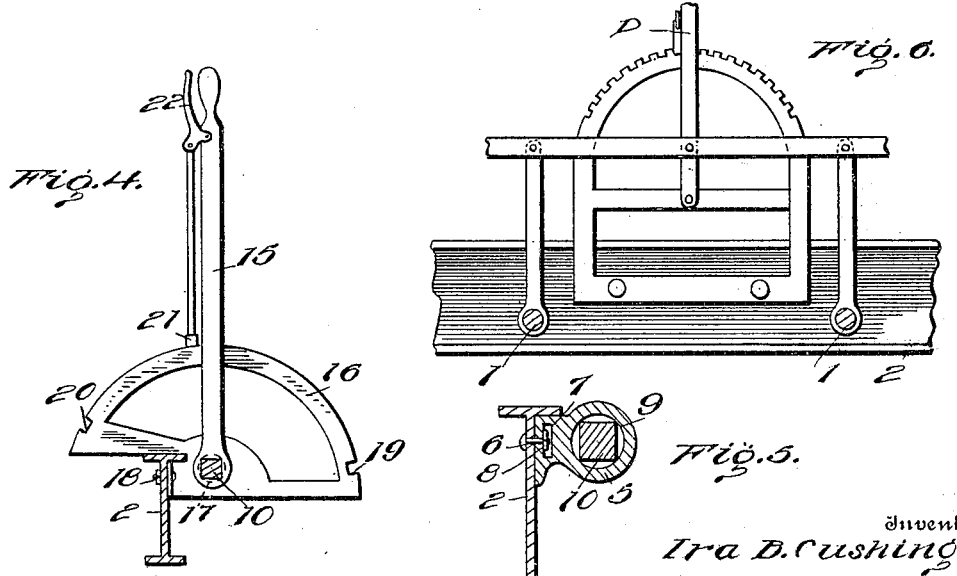
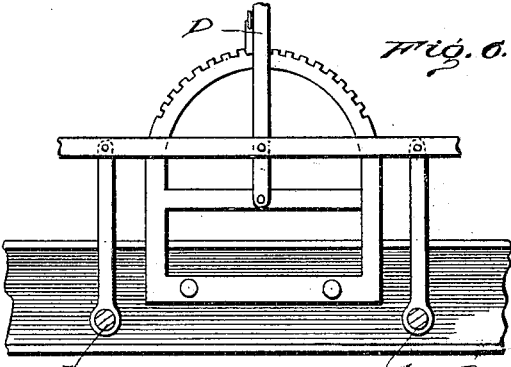
Witnesses
G. R. Thomas
E. M. Colford
Inventor
Ira B. Cushing
By Chandler & Chandler
Attorneys

UNITED STATES PATENT OFFICE.

IRA B. CUSHING, OF TISKILWA, ILLINOIS.

HARROW.

No. 825,193.   Specification of Letters Patent.   Patented July 3, 1906.

Application filed May 3, 1905. Serial No. 258,642.

*To all whom it may concern:*

Be it known that I, IRA B. CUSHING, a citizen of the United States, residing at Tiskilwa, in the county of Bureau, State of Illinois, have invented certain new and useful Improvements in Harrows; and I do hereby declare the following to be a full, clear, and exact description of the invention, such as will enable others skilled in the art to which it appertains to make and use the same.

This invention relates to harrows.

One object of the invention is to obviate the necessity, when it is desired to move a harrow from one field to another, of taking a harrow apart, loading it upon a wagon, hauling it to the place desired, and unloading and putting it together again.

Another object of the invention resides in an improved means for attachment to any form of plow to enable the conveying of the harrow from one field to another without separating the parts of the latter.

A still further object of the invention resides in the association of runners with an ordinary harrow in such manner that the runners may be elevated above the teeth of the harrow when not designed for use and which may be forced downwardly below the lower ends of the teeth to permit the dragging of the harrow from one field to another.

With these and other objects in view the present invention consists in the combination and arrangement of parts, as will be hereinafter more fully described, shown in the accompanying drawings, and pointed out in the appended claim, it being understood that changes in the form, proportion, size, and minor details may be made within the scope of the claim without departing from the spirit or sacrificing any of the advantages of the present invention.

In the drawings, Figure 1 is a plan view of a harrow embodying my invention and showing the forward end of a second harrow secured thereto. Fig. 2 is a side elevation of the invention, illustrating the runners in their raised position. Fig. 3 is a side elevation of the harrow, illustrating the runners in their lowered position. Fig. 4 is an elevation of the runner-operating lever, illustrating the main frame and the rocking beams in section. Fig. 5 is a sectional view through one of the main frame-beams and one of the hangers for supporting the rocking beams. Fig. 6 is a detail view of the lever mechanism.

Referring now more particularly to the accompanying drawings, I have illustrated one form of harrow, including the tooth-bars 1 and the main frame-beams 2, each beam having a crank-bend 3 at its opposite ends, the slant of the teeth 4 of the tooth-bars 1 being adjustable by the manipulation of a lever D, arranged and associated with the central or intermediate main beam 2 in the usual ordinary manner, as clearly shown in the accompanying drawings.

It is obvious that the main frame-beams 2 may or may not be of I form, as shown in the drawings; but regardless of the form in cross-section of these main frame-beams, I secure to the forward and rear beams brackets 5, the connection thereto of the brackets being made through the instrumentality of suitable bolts 6, which pierce the corresponding beams with their heads upon the outer face thereof and their free ends entering the slot or opening 7 in the rear of the bracket, where they may be engaged by suitable nuts 8 to prevent accidental displacement of the brackets. These brackets are disposed, preferably, at the top of said beams 2 and are enlarged at their free ends, where they are provided each with a circular opening 9.

It will be understood that the brackets of each forward and rearward main frame-beam are arranged in alinement for the reception of a rocking bar 10, which latter is preferably rectangular in cross-section, as shown. While these rocking bars 10 are formed rectangular in cross-section, they are of such size as to rock within the circular openings 9 of the corresponding brackets and are rectangular in cross-section for the rigid connection of links 11, disposed thereupon at the ends thereof, which latter are slanted rearwardly of the harrow from their upper ends and pivotally connected at their lower ends, by means of a suitable pivot-pin 12, to the side faces of the runners 13 and 14 upon opposite sides of the harrow. Further, by reason of the rectangular formation of the rocking bars 10 the lever 15 may be rigidly secured to the rear one thereof for rocking purposes.

It will be noticed that the lever 15 is disposed at the rear of the harrow and that a notched segment 16, having a circular bearing-opening 17, embraces the rear rocking bar 10 and is secured to the rearward main frame-beam through the instrumentality of a suitable bolt 18. By reason of the circular opening in the segment 16 the latter does not rotate upon rocking of the rear rocking bar 10, but is held rigidly with the main frame-beam 2 by reason of the bolt connection 18.

It will be noticed that there are but two notches 19 and 20 in the segment 16, the said notches being mounted, respectively, at the extreme forward and rearward ends of the segment. When the pawl 21 of the lever 15 is manipulated by means of the hand-piece 22, pivoted to the lever 15, the pawl may be engaged interchangeably with the notches 19 and 20 to hold the runners 13 and 14 above or below the lower ends of the teeth 4 of the harrow.

It will be observed that the link connections 11 between the rocking bars and the runners are arranged beneath the crank-pin 3 of the main frame-beams, so as to permit the upward and downward adjustment of the runners. The rocking of the rear rocking bar through the instrumentality of the lever 15 occasions a corresponding rocking of the forward rocking bar irrespective of whether or not there be a connection between the bars other than described. However, if desired, a connecting-rod $a$ may be arranged between the rocking bars.

Of course if there be two or three harrow-frames connected together each frame may be provided with my improved means for running the harrow over the ground without taking the same apart and loading it onto a vehicle for moving purposes. It is obvious, too, that, if desired, one or more harrows may be placed upon one harrow-frame provided with my improved mechanism and moved therewith to a distant point, the mechanism being of such strength as to support the increased load in this manner. It is still further obvious that a drag-bar could be placed upon a harrow-frame and conveyed in a similar manner. However, in Fig. 1 of the drawings I have disclosed the forward end of a second harrow with the forward ends of the runners 13' and 14' of the second harrow connected by suitable connections 23 to the rearwardly-upturned ends of the forward runners 13 and 14, the reference character 24 designating suitable draft appliances secured to the forward upturned ends of the runners 13 and 14 of the forward harrow.

When the pawl 21 of the lever 15 is in engagement with the forward notch 19 of the segment 16, the runners are out of contact with the ground and are at such elevation as to permit the proper working of the harrow-teeth and also to prevent clogging of dirt or other foreign matter therebetween and the harrow elements or frame. When it is desired to move the harrow from one field to another or to some other location, the tooth-bars and harrow-teeth may be inclined, if desired, through the instrumentality of the lever associated with the intermediate frame-beam, as well understood, and the lever 15 then manipulated to throw the pawl 21 into engagement with the rearward notch 20 of the segment 16, causing the runners to be thrown downwardly beneath the lower ends of the teeth and providing for the conveyance of the harrow from one point to another.

What is claimed is—

In a harrow, the combination with spaced frame-beams each having upwardly-directed crank-bends adjacent to its ends, of tooth-bars mounted in the frame-beams for rocking movement, teeth carried by the tooth-bars, said bars being movable to vary the slant of the teeth, a bracket secured to each frame-beam adjacent to its crank-bend, shafts revolubly engaged in the brackets, links carried by the shafts and for movement therewith to extend at times obliquely through the crank-bends of the beams, runners secured to the links, said shafts being movable to direct the links downwardly at times, said links being arranged to lie when in downwardly-directed position with the runners below the lower ends of the teeth, means for moving the shaft, and means coöperating with the moving means for holding the shafts at times with the runners in raised position and at times with them in lowered position.

In testimony whereof I affix my signature in presence of two witnesses.

IRA B. CUSHING.

Witnesses:
RICHARD L. CUSHING,
ELLEN E. CUSHING.